United States Patent
Aloisio, Jr. et al.

(10) Patent No.: US 6,501,900 B1
(45) Date of Patent: Dec. 31, 2002

(54) VARIABLE OPTICAL FIBER ATTENUATOR DEVICE

(75) Inventors: Charles Joseph Aloisio, Jr., Atlanta, GA (US); Robert William Filas, Bridgewater, NJ (US); Wilton Wayt King, Chamblee, GA (US); William Roger Lambert, Chester, NJ (US); Claire H. Plagianis, Roswell, GA (US); George John Shevchuk, Old Bridge, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/502,247

(22) Filed: Feb. 17, 2000

(51) Int. Cl.[7] ................................. G02B 6/00
(52) U.S. Cl. ........................... 385/140; 385/60
(58) Field of Search .................. 385/58, 60, 62, 385/66, 70, 72, 73, 75, 76, 140, 48

(56) References Cited

U.S. PATENT DOCUMENTS

| | | |
|---|---|---|
| 4,186,999 A | 2/1980 | Harwood et al. |
| 4,372,641 A | 2/1983 | Johnson et al. |
| 4,512,630 A | 4/1985 | Runge |
| 4,998,795 A | 3/1991 | Bowen et al. |
| 5,066,094 A | 11/1991 | Takahashi |
| 5,082,345 A | 1/1992 | Cammons et al. |
| 5,122,390 A | 6/1992 | Rearick et al. |
| 5,134,676 A | 7/1992 | Boillot et al. |
| 5,263,103 A | 11/1993 | Kosinski |
| 5,311,614 A * | 5/1994 | Caron et al. ............... 385/140 |
| 5,589,119 A | 12/1996 | Hetherington |
| 5,619,610 A | 4/1997 | King et al. |
| 5,734,778 A | 3/1998 | Loughlin et al. |
| 5,778,127 A | 7/1998 | Gilliland et al. |
| 6,097,873 A * | 8/2000 | Filas et al. ............... 385/140 |

* cited by examiner

Primary Examiner—Cassandra Spyrou
Assistant Examiner—Euncha Cherry
(74) Attorney, Agent, or Firm—Lowenstein Sandler PC

(57) ABSTRACT

An optical fiber connection device is disclosed that allows for in situ variable attenuation of a signal transmitted between two optical fibers. The connection device comprises an attenuator element fabricated with an inherently compliant, elastomeric material, preferably a silicone elastomer. The elastomeric properties of the attenuator element allow for varying the thickness of the attenuator element and thereby changing the level of attenuation in situ. Silicone elastomers are preferred for fabricating the attenuator element as applicants have discovered they may be index-matched to optical transmission fibers, have a high creep modulus, exhibit relatively constant mechanical properties over a broad range of temperatures, and are reliable upon exposure to varied environmental conditions.

17 Claims, 4 Drawing Sheets

VARIABLE OPTICAL FIBER ATTENUATOR DEVICE

RELATED APPLICATIONS

This application is related to U.S. patent application Ser. No. 09/007,134, "Improved Optical Fiber Attenuator Device," filed Jan. 14, 1998, which is assigned to the present assignee and incorporated herein by reference.

FIELD OF THE INVENTION

The invention relates to an optical communications device, and more particularly, to a variable optical fiber attenuator adapted for use in a compression connection device of an optical communications system.

BACKGROUND OF THE INVENTION

Optical communications systems include a variety of devices interconnected with optical fibers (e.g., light sources, photodetectors, switches, amplifiers, filters, and so forth). Signals are transmitted along an optical fiber by internal reflection, e.g., the core of the fiber is fabricated with a material having a higher index of refraction than the cladding surrounding the core so that light signals launched into the fiber will be guided along the core by internal reflection. For typical transmission applications, a fiber optic core is fabricated with about 3% $GeO_2/SiO_2$.

In designing optical communications systems, lengths of optical fibers are terminated and connected to other fibers, devices, or termination ports. For example, in a wavelength division multiplexed optical network system, optical fibers may be used to connect a plurality of transmitters to a multiplexer, an optical switch, a demultiplexer, and a receiver, and signals may be sent over the length of the fibers between the multiplexer and receiver, with various connections being made along the transmission path. A widely-used connector comprises the ST® connector, ST® being a registered trademark of AT&T Corp., now Lucent Technologies, Inc., the assignee of the present application. The ST® connector and various other connectors are known and used in the field.

Many challenges inhere in making these connections while maintaining efficient signal transmission, and in particular, in providing connectors that provide a desired level of attenuation in the transmitted signal. Such challenges include aligning the fiber cores, index-matching the materials to achieve low reflectance, addressing thermoplastic creep issues, and achieving and varying the levels of signal attenuation. For example, fiber cores typically have small diameters (e.g., they may be as small as 8 microns), and thus, it is difficult to precisely align the cores of two fibers.

As mentioned, index-matching is a concern in the connection devices. An index differential between interfacing components will affect the reflectance of the transmitted signal. The closer index-matching there is between interfacing materials, the less reflectance there will be. Reflectance can be calculated as a function of the refractive index differential of interfacing materials, i.e., $$\text{Reflectance (dB)} = 10 \log[(n_o - n_i)^2 / (n_o + n_i)^2],$$

where $n_o$ and $n_i$ are the refractive indices of two interfacing materials. Thus, for a glass-to-air interface ($n_o \approx 1.0$ for air, $n_i \approx 1.46$ for glass), the reflectance is about 14.6 dB. For two materials with only slightly different indices of refraction (e.g., $n_i \approx 1.46$ vs. 1.47), the reflectance is −49.3 dB. Optimally for high performance systems, reflectance generated by an optical connection should be less than −50 dB.

Another concern that affects the selection of materials used to make connection devices relates to glass transition temperatures and thermoplastic creep. In operation, an attenuator of a compression connection device will be pressed against an optical fiber for long periods of time and subjected to large compressive forces. These forces create indentations on the attenuator surface. If the attenuator is left in place, the indentation will not affect the system performance. However, the attenuators are usually repeatedly removed and re-inserted into the connector device. Where an indentation is formed on an attenuator, it is unlikely that the attenuator, when placed back into a connector, will rest against the fiber in exactly the same way as in the initial connection. For example, upon reconnection, the fiber end face may hit a lip of a depression. An air gap thus may be formed which would negatively affect the attenuation and back-reflection properties of the device, for as indicated above, an air-fiber interface produces a large refractive index differential.

The extent of creep and therefore, the extent or size of the surface deformations will depend on the applied force, the use temperature, and the glass transition or heat distortion temperatures of the materials used to fabricate the connector elements. The heat distortion temperature reflects the temperature at which significant distortions occur. In other words, the glass transition or heat distortion temperature is the temperature at which the material's behavior changes from a high modulus, glassy response to a low modulus, rubbery response. The glass transition temperature is typically measured at 264 psi according to standards known in the field as ASTM D648. The higher the heat distortion temperature of the materials, the more resistant the material will be to deformation. Materials having glass transition temperatures below room temperature are identified herein as "compliant" materials. The term "compliance" is used herein to refer to a material's susceptibility to deformation upon compression. Thus, a high compliant material is one that exhibits a rubbery, deformable response at room temperature, and a low (or non-) compliant material is one that is more resistant to deformation and exhibits significantly smaller indentations at room temperature over relatively long periods of time. The period of time during which an indentation would be resisted is temperature dependent. At ambient temperatures, a low-compliant material will resist indentations for a period of years. At elevated temperatures, this period may be reduced to months.

To reduce the likelihood of thermoplastic creep, traditionally efforts had been directed toward developing very stiff, non-compliant materials (e.g., having glass transition temperatures above room temperature), so that compression of the materials would not produce indentations. It has been taught that the heat distortion or glass transition temperature of the attenuator materials should be greater than about 80° C. and even more preferably above 100° C. For example, U.S. Pat. No. 5,082,345 to Cammons et al., issued Jan. 21, 1992 and assigned to the present assignee, describes a connection device that uses polymethylmethacrylate (PMMA) to fabricate an attenuator element. PMMA is a stiff (non-compliant) material resistant to indentations; it is used to make a disc-shaped attenuator element which is disposed between opposing optical fibers and held in place in a connector sleeve by spring-loaded plugs (see, e.g., Cammons FIG. 2, col. 7, 1. 48–65). However, PMMA has an index of refraction of 1.49, whereas a fiber optic core typically has a refractive index of about 1.451 at 25° C. and 1300 nm. This refractive-index differential correlates to an attenuator portion producing −40 dB reflectance which is suitable for many applications, but less than optimal for high performance optical fiber systems.

Additionally, in the Cammons design, levels of attenuation are not tuned in situ. Light emerging from a fiber incident on the attenuation element is scattered in the forward direction toward an opposing fiber. The magnitude of the light accepted by the opposing fiber is determined by the acceptance angle that is established by the physical separation between the two fibers. Elements with known thicknesses and known attenuation levels are provided in pre-assembled optical fiber buildouts or couplers. Consequently, Cammons introduces a certain, predetermined gap between the connected fibers and provides for a fixed level of attenuation.

An improved optical terminator having closely-index matched materials is described in U.S. Pat. No. 5,619,910, issued Apr. 8, 1997 to King et al, titled "Optical Terminator" (assigned to the present assignee and incorporated herein). The device of the King patent uses a ferrule having an index of refraction of about 1.45±0.01, and advantageously it achieves an attenuation of less than 50 dB below the incident signal (e.g., at col. 8, 1. 25–33). In achieving index matching, King uses thermoplastic polymers and raises their heat distortion temperatures by blending them with other compounds such as polyimide, polyvinylidene fluoride, and polymethylpentene polymers. Thus, King follows the teaching that materials having high (above room temperature) heat distortion or glass transition temperatures are preferred (e.g., col. 6, 1. 56–57). However, blending the materials with compounds to increase their heat distortion properties may unacceptably alter the refractive indices of the materials, and vice-versa. Also, there are a limited number of thermoplastic polymers that may be used in optical connections meeting all the desired criteria. Furthermore, the King device is configured as a terminator device for which in situ tuning of the attenuation level is not pertinent.

Previous attenuators that allow for in situ tuning typically rely upon adjustable air gaps as described, for example, in U.S. Pat. No. 5,734,778, "Variable Attenuator Connector," issued Mar. 31, 1998 to Loughlin et al, and U.S. Pat. No. 5,066,094, "Variable Optical Fiber Light Attenuator," issued Nov. 19, 1991 to Takahashi. In both the Loughlin and Takahashi cases, mechanical assemblies (e.g., with use of screws and nested thread assemblies) are used to vary the size of an air gap formed between the end faces of two aligned fibers, and the change in the space between the fibers (the size of the air gap) produces a change in attenuation level. However, as noted above, there is a large refractive index differential at a fiber/air interface. Thus, back reflection is a concern with these devices, making them disadvantageous for many telecommunications applications and/or requiring additional features designed to address back reflection problems.

As may be appreciated, those in the field of communications systems continue to seek to develop new components to improve performance, increase efficiency, and reduce cost. In particular, there remains a need for an optical attenuator element that is index-matched to optical fibers to achieve low reflectance, and that addresses thermoplastic creep and is tunable to a wide range of attenuation levels, allowing for in situ tuning of the attenuation level.

SUMMARY OF THE INVENTION

Summarily described, the invention comprises an attenuator assembly of a connection device for use in an optical communications system that is tunable in that the level of attenuation can be varied in situ. Tunability is achieved with use of an elastomeric attenuator element disposed between the end faces of at least two optical fibers. With the invention, a mechanism is provided for changing the thickness of the attenuator element in situ in the connection device, e.g., by compressing or enabling the expansion of the attenuator element, which thereby varies the level of attenuation of the signal. Preferably, the attenuator element is fabricated with silicone and the thickness-adjusting mechanism comprises at least one spring-loaded plug adjacent at least of the optical fiber end faces.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and, except for the graphs, are not to scale.

DETAILED DESCRIPTION OF THE INVENTION

Applicants have discovered that, contrary to previous teachings, a material having a low glass transition temperature, and in particular, a glass transition temperature below room temperature, may be effectively used to fabricate an attenuator element of a compression connection device. Under conditions of thermal and mechanical stress, as in an optical fiber attenuator, elastomeric materials (particularly silicone elastomers) can degrade. Thus, traditional teachings relating to glass transition temperatures and stability of elastomeric materials suggest that elastomeric materials would not be suitable for use in a compression connection system. Nonetheless, the inventors have discovered elastomeric attenuators that provide attenuation of less than −50 dB and are surprisingly effective. Attenuators fabricated with elastomers may be index matched to the core of an optic fiber (e.g., having a refractive index of about 1.45±0.06), enable reflection of less than −50 dB, allow for easy manufacturing, and are resistant to permanent deformation.

For example, applicants have discovered silicone elastomeric elements which, even after aging, produce reflectance of −54.2 dB when a 0.060-inch thick attenuator is used. Applicants have discovered unaged silicone attenuators having thicknesses of about 0.02 inches which produce reflectance values falling between −60 dB and −70 dB. The problem of thermoplastic creep is avoided in that the elastic properties of the materials ensure that the attenuators resist irreversible surface perturbations, e.g., a deformation induced by a connection recovers upon a disconnection. Attenuator elements fabricated with elastomers, particularly silicone elastomers, are further described in U.S. patent application Ser. No. 09/007,134, "Improved Optical Fiber Attenuator Device," filed Jan. 14, 1999, (referred to herein as the "Filas '134 application"), which is assigned to the present assignee. The entire contents of the Filas '134 application are incorporated herein by reference.

Figure 1:
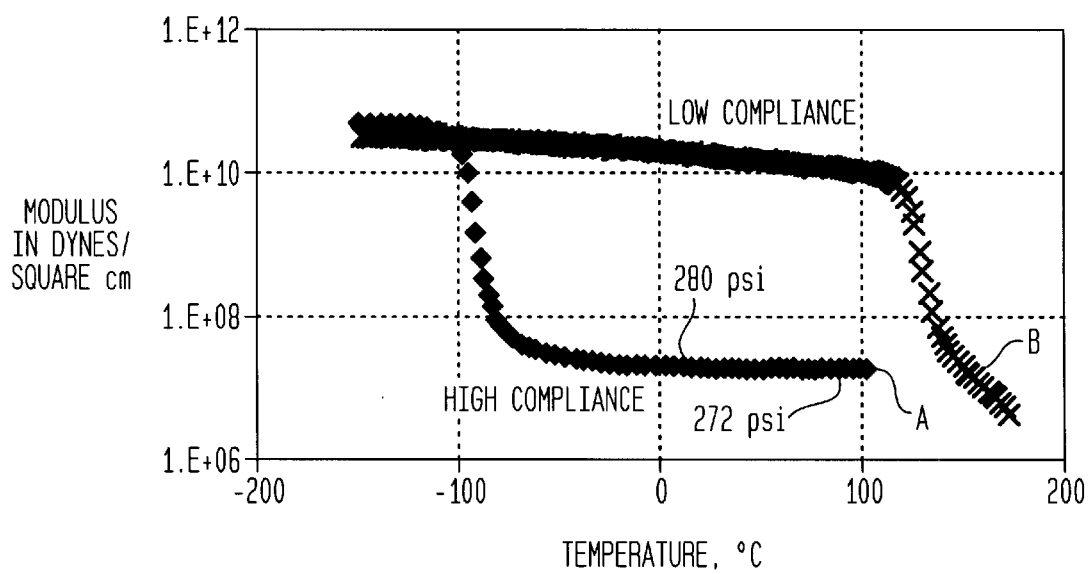
FIG. 1 is a graph plotting the modulus in dynes/square inch as a function of temperature for NUSIL™ and LUCITE ACRITHERM HS 3125™.

Applicants have further discovered that attenuator elements having elastomeric properties enable the fabrication of a variable attenuator assembly, i.e., wherein the level of attenuation can be adjusted in situ. FIG. 1 is a graph plotting the modulus in dynes/square inch as a function of temperature for NUSIL™ (curve A) and LUCITE ACRITHERM HS 3125™ (curve B). NUSIL™ is a high compliance/low modulus material comprising cross-linked silicones. It has a glass transition temperature of −89° C. As described in the Filas '134 application, NUSIL™ is commercially available from Nusil Silicone Technology of Carpinteria, Calif., identified as CF1-6755. It is a tough, optically clear silicone (having a type A durometer hardness of 35), with a refractive index of about 1.45 and a modulus plateau of about 272 psi. The operating temperature range is from about −115° C. to +265° C. The product comprises a two-part silicone system, i.e., Part A CF1-6755 (available from Nusil) mixed with Part B CF1-1755 in equal parts by weight. An advantageous method of preparing the product is set forth in the Filas '134 application.

In comparison, the LUCITE ACRITHERM HS 3125™ material (FIG. 1, curve B) is a low compliant material, and as such, is not suitable for the instant application. LUCITE is not cross-linked, and its glass-transition temperature is about 134° C., as can be seen in FIG. 1, as its modulus takes a dramatic drop at that temperature. Applicants have discovered that the cross-link density establishes the modulus of the elastomer, and thus, for the instant application, a highly cross-linked material is preferred. For example, in FIG. 1, the NUSIL™ will withstand a force of 280 psi at 0 degrees C. and a force of 272 psi at 100 degrees C. Notably, as reflected in FIG. 1, an added advantage in using the low-compliant NUSIL™ material is the absence of significant time dependence in the deformation process, e.g., FIG. 1 reflects a small (10 psi) drop in modulus between 0 and 100° C.

Figure 6:
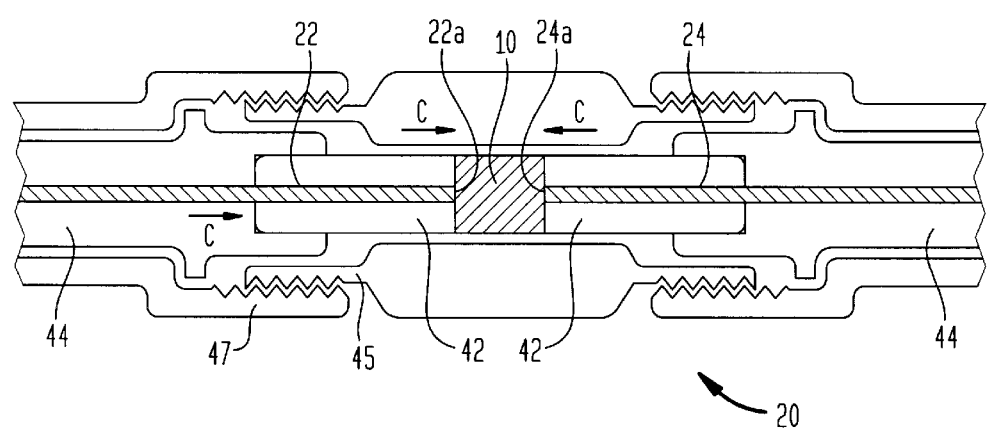
FIG. 6 is a schematic cross-sectional view of an attenuator assembly providing for variable attenuation with use of the inventive attenuator element.
Figure 7:
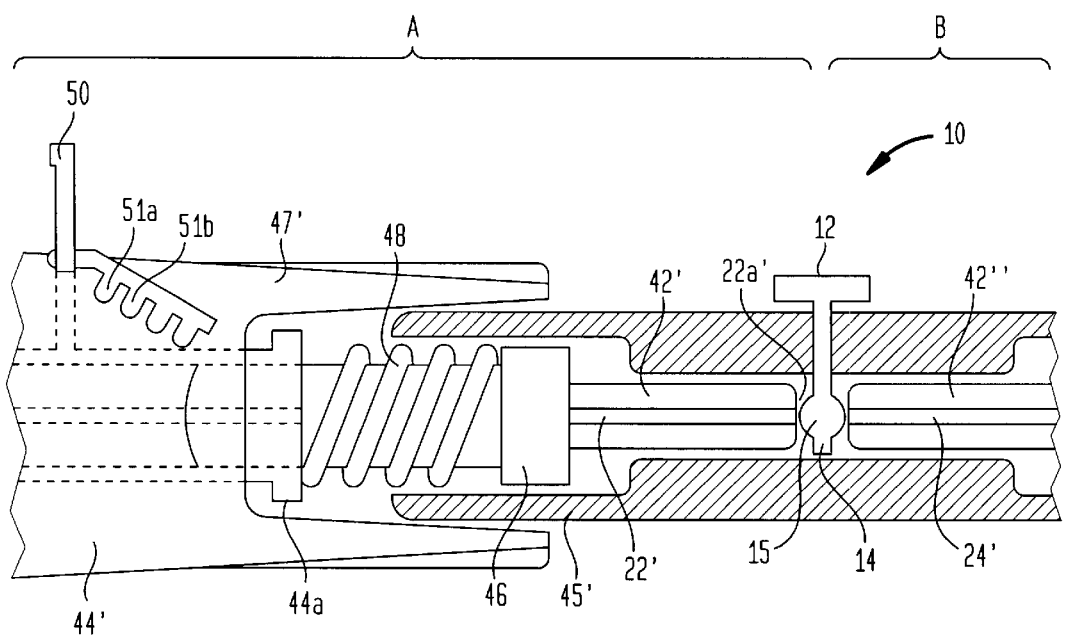
FIG. 7 is a partially cut away view of an alternative attenuator assembly providing for variable attenuation with use of the inventive attenuator element.

Traditional teachings would instruct that NUSIL™, having a glass transition temperature of −89° C., would be unsuitable for an attenuator. However, applicants have discovered that this attenuator can be used in a connection system in which one signal is transmitted between at least two optical fibers (as illustrated in FIGS. 6 and 7, discussed below). Each of the at least two optical fibers having end faces, and the attenuator element is placed between the end-faces of the fibers. Given the elastomeric properties of the attenuator, the thickness of the attenuator element can be changed in situ, i.e., while in the connection device, by compressing the attenuator element or allowed it to expand. This change in thickness results in a change in the level of attenuation of the signal. Any compliant (low glass-transition temperature) material may be considered for use in the inventive attenuator.

Figure 2:
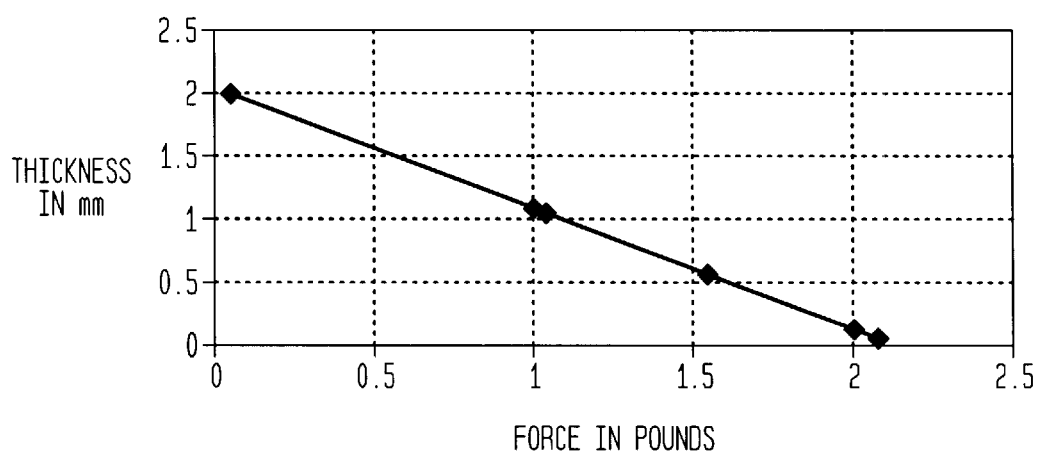
FIG. 2 is a graph plotting the thickness of an exemplary, inventive attenuator element as a function of applied force.
Figure 3:
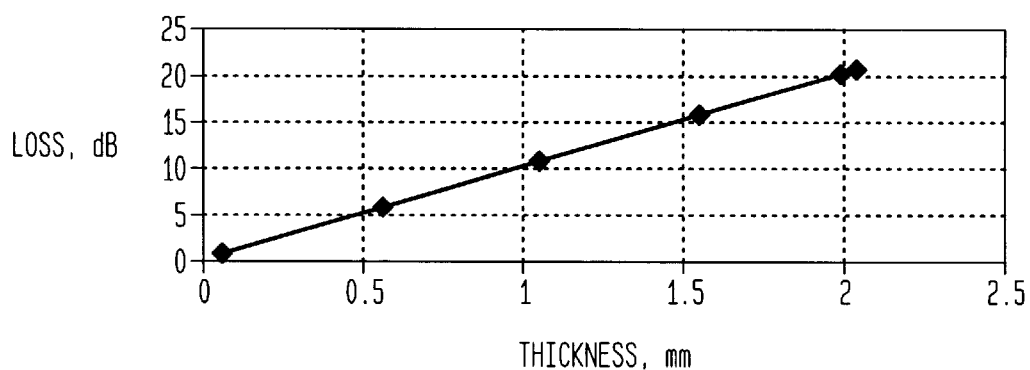
FIG. 3 is a graph of the level of attenuation (loss) as a function of thickness for a traditional, non-compliant attenuator, which may be used to calculate the loss for an inventive, compliant attenuator.
Figure 4:
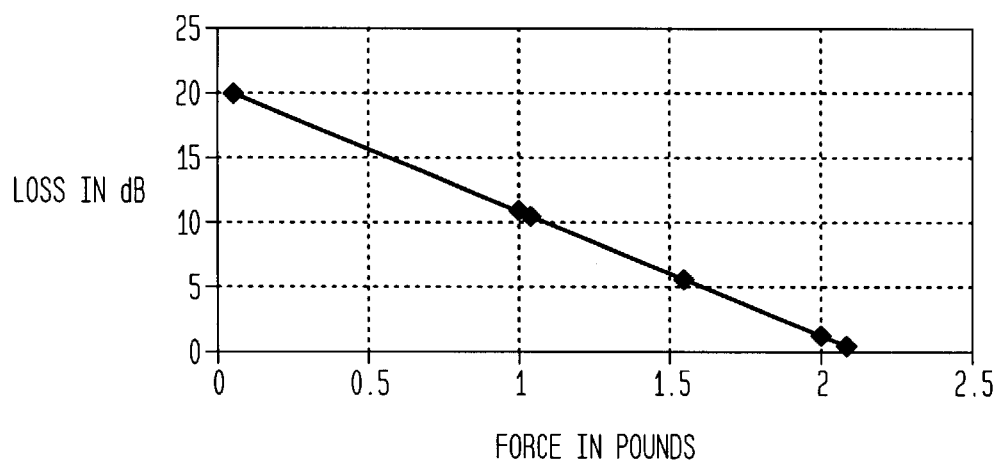
FIG. 4 is a graph of the level of attenuation (loss) as a function of applied force for an inventive, compliant attenuator.

As a further illustration, FIGS. 2 through 4 are plots demonstrating that the level of attenuation achieved with a silicone attenuator according to the invention can be varied with applied force. The figures further show how the degree of attenuation for a particular application can be determined or predicted, e.g., using attenuation versus thickness values for non-compliant attenuators. Using mechanical spectroscopy data and information about loss versus thickness for current attenuator products, the relationship between force and loss may be determined for an inventive, compliant attenuator, and then the level of force required for the desired attenuation can be applied. For example, consider FIGS. 2–4 and the example of an attenuator element having an initial thickness of 2.05 mm, a contact diameter of 2.5 mm, and a refractive index of about 1.5. As shown in FIG. 2, there is a linear elastic variation in thickness with applied force. An attenuator having a thickness of about 2 mm may be reduced to a thickness of about 0.1 mm upon application of a two-pound force. As shown in FIGS. 3–4, this change in thickness produces a variation in loss of about Δ20 dB. As shown in FIGS. 2–4, a range of attenuator thicknesses of from 0.05 to 2 mm will produce attenuations in the range of 1 dB to 20 dB. Thickness variations of about 0.01 mm correspond to (will produce) attenuation variations of less than 0.3 dB. Consequently, fine tuning may be achieved, i.e., the attenuation level may be changed in increments of as low as about 0.2 dB.

Figure 5A:
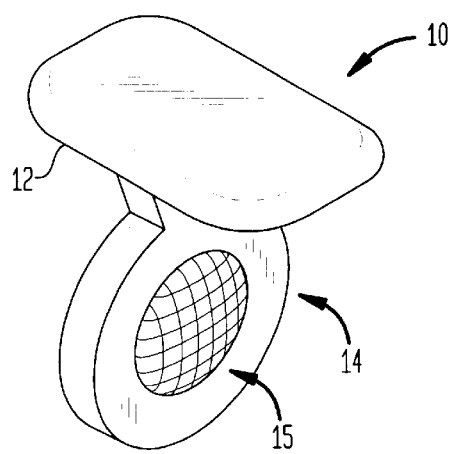
FIG. 5A is a perspective view of one embodiment of the inventive attenuator element.
Figure 5B:
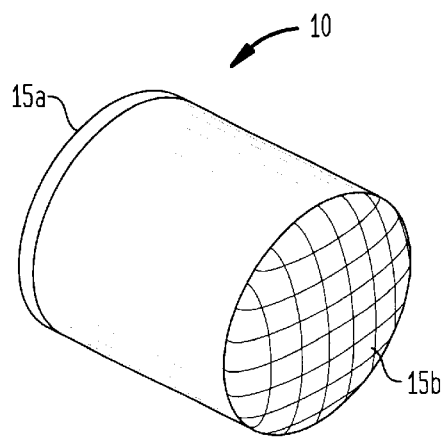
FIG. 5B is a perspective view of an alternative embodiment of the inventive attenuator element.

FIGS. 5A and 5B show illustrative perspective views of alternative embodiments of the inventive attenuator element, and FIG. 6 is a schematic cross-sectional view of an attenuator assembly providing for variable attenuation with use of an elastomeric attenuator element. As shown in FIG. 5A, the attenuator 10 may comprise a rigid or non-compliant frame 12 with a disc-shaped portion or spacer 14 extending therefrom that is adapted to be placed between the end faces of two optical fibers. A bead or centrally-disposed convex-shaped area 15 is disposed on the spacer. The bead 15 is fabricated with silicone or another elastomeric material and is so oriented that, when the spacer 14 is placed between the optical fibers, the end faces of the fibers abut the bead 15. The bead 15, originally thicker than the rigid spacer 14, may be compressed by the fibers (and/or connector ferrules in which the fibers are held), until the ferrules hit the spacer. The spacer 14 may be fabricated with a rigid plastic as with previous attenuators; however, the transparency of the spacer is not a concern as it is not necessarily aligned along the transmission path. Thus, the spacer may be fabricated with other rigid materials such as metals. In FIG. 5B, the attenuator element comprises a cylindrical plug having two opposing surfaces 15a, 15b, adapted to be placed between the end faces of two optical fibers. Here, either the entire attenuator, or at least the opposing surfaces 15a, 15b, are fabricated with the elastomeric material and are convex-shaped. It is preferable to have convex surfaces in contact with the fiber tips to enhance the performance range.

An attenuator assembly of a connection device is shown in FIG. 6. The connection device 20 couples together two optical fibers 22, 24 disposed along a transmission path, wherein at least one signal is transmitted between the at least two optical fibers. Each one of the fibers has end faces 22a, 24a, that are aligned and spaced apart with an attenuator element 10. The attenuator element is fabricated with the cross-linked compliant elastomeric material as described above. A mechanism 40 is provided for changing the thickness of the attenuator element in situ, that is, while the attenuator is in place in the connection device, between the fibers, for varying the level of attenuation of the signal. In FIG. 6, this mechanism comprises a threaded nesting assembly. The end faces of each of the fibers are held in a ferrule or plug 42, which in turn is held in a base portion 44. A threaded, cylindrical sleeve 45 holds the attenuator 10, each one of the ferrules 42, and a portion of each base portion 44. A threaded housing 47 is wound over the threaded sleeve, and as the housing is wound on the sleeve 45 further toward the attenuator element 10, the housing pushes against the base portions to press the ferrules and fiber end faces against the attenuator 10. Since the attenuator is elastomeric, this compression reduces the thickness of the attenuator and moves the fiber end faces closer together, following arrows "c".

FIG. 7 shows a schematic, partially cut-away view of an exemplary, alternative embodiment of the attenuator assembly providing for variable attenuation with use of an elastomeric attenuator element configured as shown in FIG. 5A. Here, one side of the connection device (that is, adjacent the end face 22a' of one fiber 22') is shown at region A, and the arrangement at the other side of the connector (i.e., region "B", surrounding an opposing fiber 24') may be a mirror image of this configuration or have any number of arrangements, including a fiber end held substantially in a fixed position within ferrule 42". In any case, the connector includes use of a spring 48 placed around a plug 46 positioned between the ferrule 42a' (holding fiber 22') and the base portion 44', held within housing 47'. The spring biases the plug 46 against the ferrule 42a at one end of the plug and against the base 44' at the other end of the plug, where the spring abuts a ledge 44a on the base 44'. The end face 22a' of the fiber held within ferrule 42' is secured against the bead portion 15 of the attenuator element 10, which may have a rigid frame 12 with spacer 14, protruding downward. The ferrule 42' and spring-biased plug 46 are held within a sleeve 45', which has an opening for insertion of the attenuator element 10.

A key 50 protrudes from the base, out of a slot in the housing 47', and can be used to compress the spring and move the fiber end face against the attenuator. When the key 50 is moved within slot further toward the attenuator 10, the ledge 44a' of base 44' pushes against the spring, causes the spring to compress and push the plug 46 further toward the attenuator element 10. Advantageously, the housing has a graduated keyway with differently positioned slots, e.g., 51a, 51b, etc., for locking the key, so that the spring can be compressed in predetermined incremental amounts and held in place. Optionally, a graduated scale (not shown) is imprinted on the housing. The attenuator bead 15 can be compressed until the ferrule 42' hits the rigid portion of the spacer 14, while the end face of the fiber remains abutted to the bead 15.

Using knowledge of the modulus, the attenuator may be designed so that its thickness will change to provide a desired level of, or variation in, attenuation given a particular spring load (e.g., a 1 to 2 pound load) as used in the connectors. The elastomeric attenuators may be fabricated with different thicknesses to provide for a variety of loss levels. For example, an elastomeric attenuator molded at a thickness of 0.01–0.05 may be placed between two mating fibers and then compressed to a thickness in the range of about 0.006–0.02 inches. Advantageously, the attenuator element provides a variable reflectance, depending upon its thickness in the range of between 0 dB to –65 dB measured at about 1300 nm to 1500 nm and 23° C. With changes in thickness, tuning of attenuation levels can be achieved in increments in the range of less than 10 dB, more preferably in the range of about 0.2–0.3 dB. Also, the crosslinking chemistry of the elastomers can be varied to achieve a range of moduli and compliances to alter the amount of deformation that occurs under spring force. As the cross-linking of the polymer molecules increases, the rubbery modulus increases. Cross-link densities producing rubbery moduli in the range of about 100 to 500 psi are advantageous in producing the in situ tunable attenuators.

It will be understood that the embodiments described herein are merely exemplary and that a person skilled in the art may make variations and modifications without departing from the spirit and scope of the invention. For example, it will be understood that the refractive index selected for the attenuator will depend upon the optical transmission wavelength, the refractive index of the optical fiber core, and the use temperature for the specific application. All such variations and modifications are intended to be included within the scope of the appended claims.

We claim:

1. An attenuator assembly of a connection device for use in an optical communications system for coupling at least two optical fibers disposed along a transmission path, wherein at least one signal is transmitted between the at least two optical fibers, each of the at least two optical fibers having end faces, the assembly comprising:

an attenuator element fabricated with a compliant elastomeric material configured to be placed between the end-faces of the at least two optical fibers and to attenuate the signal transmitted between the at least two optical fibers, and a mechanism for adjustably changing the thickness of the attenuator element in situ in the connection device for varying the level of attenuation of the signal, wherein the attenuator element provides a variable reflectance in the range of between –10 dB to –50 dB.

2. The attenuator assembly of claim 1, wherein the elastomeric material comprises a silicone elastomer.

3. The attenuator assembly of claim 1, wherein the attenuator element has a refractive index of about 1.45±0.06 at optical wavelengths of about 1300 to 1500 nm measured at about 23° C.

4. The attenuator assembly of claim 1, wherein the attenuation level is tunable at increments of less than 0.3 dB.

5. The attenuator assembly of claim 1, wherein the attenuator element provides a variable reflectance in the range of between –10 dB to –50 dB measured at about 1300 nm to 1500 nm and 23° C.

6. The attenuator assembly of claim 1 in which the attenuator element is disc-shaped and disposed within a sleeve of the optical connection device.

7. The attenuator assembly of claim 1 in which the attenuator element has two opposing surfaces and each one of the two surfaces are adapted to be placed against one of the end-faces of the at least two optical fibers, respectively, and the two opposing surfaces are fabricated with the elastomeric material.

8. The attenuator assembly of claim 7 wherein each one of the opposing surfaces comprise a convex-shaped area fabricated with the elastomeric material.

9. The attenuator assembly of claim 7 wherein the attenuator element comprises a rigid frame having a substantially rigid disc-shaped spacer portion configured to be placed against the end faces of the at least two optical fibers and a convex-shaped bead of elastomeric material is disposed within the spacer portion.

10. The attenuator assembly of claim 7 in which the mechanism comprises a spring for adjustably biasing at least one of the two surfaces against at least one of the end-faces of the at least two optical fibers for varying the thickness of the attenuator element.

11. The attenuator assembly of claim 7 in which the mechanism includes a graduated scale for controlling the variation in the level of attenuation.

12. An attenuator assembly of a connection device for use in an optical communications system for coupling at least two optical fibers disposed along a transmission path, wherein at least one signal is transmitted between the at least two optical fibers, each of the at least two optical fibers having end faces, the assembly comprising:
- a disc-shaped attenuator element having two opposing surfaces, each one of the two opposing surfaces being adapted to be placed against one of the end-faces of the at least two optical fibers, respectively, wherein the two opposing surfaces are fabricated with a cross-linked, complaint elastomeric material and are fabricated with at least one of the two opposing surfaces having a convex shape, and
- a mechanism for releasably compressing the elastomeric material of the attenuator element to adjustably change the thickness of the attenuator element in situ in the connection device for varying the level of attenuation of the signal in the range of between −10 dB to −50 dB, wherein the attenuation level is tunable at increments of less than 10 dB.

13. The attenuator assembly of claim 12 wherein the mechanism comprises a nested threaded assembly.

14. The attenuator assembly of claim 12 wherein the mechanism comprises a spring-loaded assembly including use of a spring-loaded plug for compressing at least one end face of at least one of the two optical fibers against the attenuator element.

15. An optical communications system comprising the attenuator assembly of claim 1.

16. An optical communications system comprising the attenuator assembly of claim 12.

17. A method for producing in situ variable attenuation of a signal transmitted between at least two optical fibers, each of the at least two optical fibers having end faces, the method comprising:
- providing an attenuator element fabricated with a compliant elastomeric material;
- disposing the attenuator element between the end-faces of the at least two optical fibers, the attenuator element being adapted for attenuating the signal transmitted between the at least two optical fibers, and
- changing the thickness of the attenuator element in situ to thereby vary the level of attenuation of the signal in the range of between −10 dB to −50 dB.

* * * * *